United States Patent [19]
Lepp

[11] 3,766,989

[45] Oct. 23, 1973

[54] STABILIZER ATTACHMENT-DUPLEX-CHISEL PLOW

[75] Inventor: Jacob H. Lepp, Grimsby, Ontario, Canada

[73] Assignee: International Harvester Company, Chicago, Ill.

[22] Filed: Sept. 20, 1972

[21] Appl. No.: 290,615

[52] U.S. Cl. ............................... 172/605, 172/678
[51] Int. Cl. ............................................. A01b 59/00
[58] Field of Search .................... 172/311, 456, 310, 172/605, 677, 678, 705, 239, 238, 588

[56] References Cited
UNITED STATES PATENTS
1,381,041  6/1921  Warner ............................. 172/678 X
2,339,018  1/1944  Landen ............................... 172/605
2,727,346  12/1955  Witwer ........................... 172/677 X Primary Examiner—Stephen C. Pellegrino
Attorney—Floyd B. Harman

[57] ABSTRACT

A stabilizer for a multi-section cultivator tool that is hinged along an axis parallel to the direction of travel. The stabilizer causes a portion of the draft force to be directed downwardly at a hinge point thus preventing humping up along the hinge.

9 Claims, 3 Drawing Figures

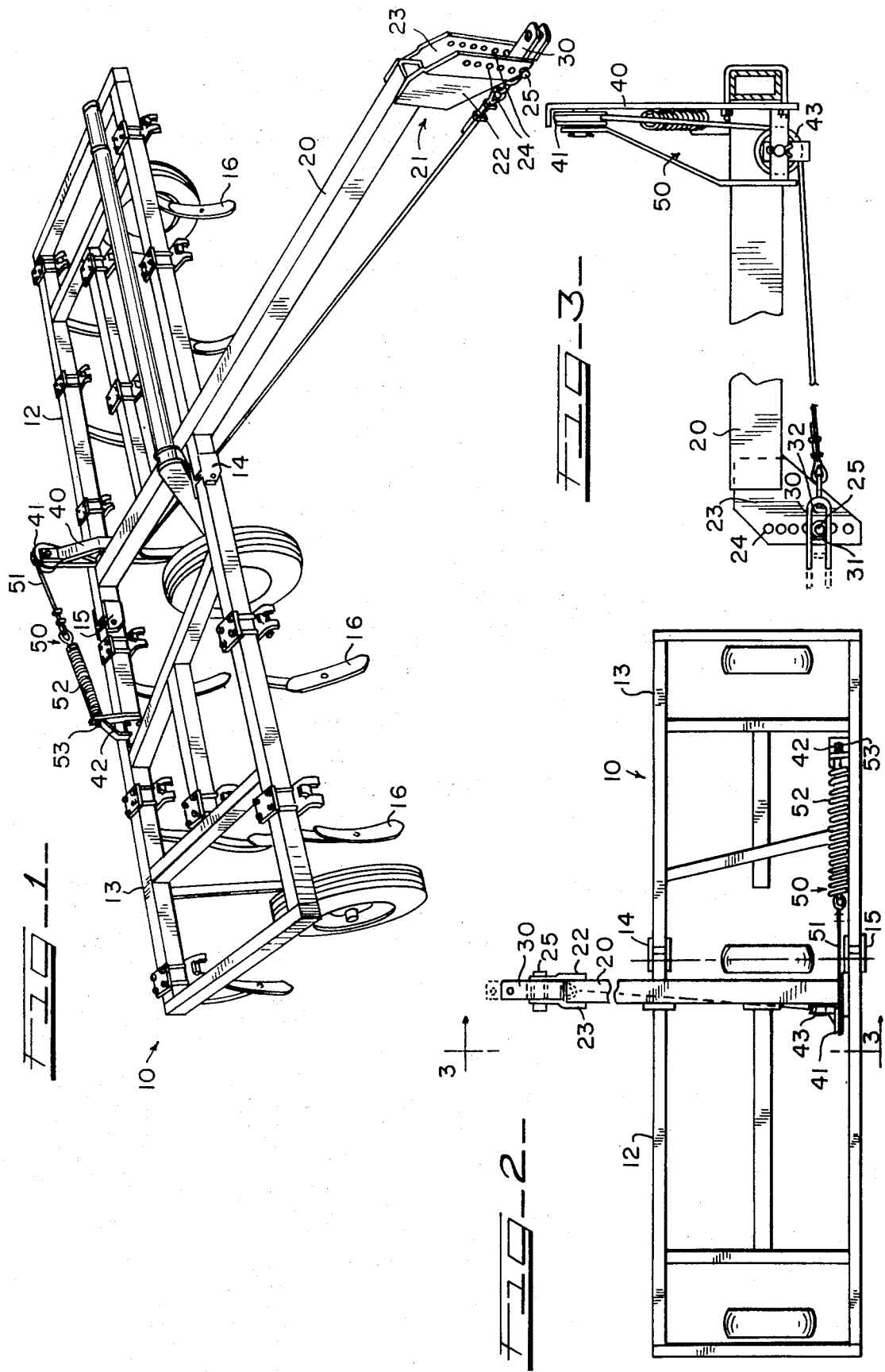

STABILIZER ATTACHMENT-DUPLEX-CHISEL PLOW

BACKGROUND OF THE INVENTION

1. Field of the Invention

The present invention relates generally to agricultural implements and more particularly to a multi-section cultivator tool that is hinged along an axis parallel to the direction of travel.

2. Description of the Prior Art

The width of a cultivating tool often exceeds the width of the pulling tractor and thus provision must be made for narrowing the cultivating tool for transport. A common method of narrowing the cultivating tool is to provide wings that can be folded up along an axis substantially parallel to the direction of travel. It is a common practice to provide a single wing-type tool wherein a central or main section has a single wing hinged to one edge thereof or a double wing-type tool with a central section having a wing hinged along both edges thereof. It is an inherent characteristic of a single wing cultivating tool that under operating conditions there is a high upper lifting component along the hinge axis. This is undesirable because as a result the cultivating tools adjacent the hinge axis will not penetrate the soil as deep as the other tools and equal penetration is desired. This upper lifting component is proportional to the draft load on the machine and consequently under severe draft loads the machine is sometimes lifted out of the ground at the center resulting in poor field performance. This condition is commonly referred to as "humping up." Several pitfalls are encountered in attempting to find a solution to the humping up problem. First if a static spring device is provided of a sufficient magnitude to overcome the humping up force this static spring would tend to lift the wing section about its hinge when the cultivator is stationary or there is a low draft load. A second solution that might be tried would be to rigidly lock this hinge to thus prevent a hinge action even under extreme conditions. If this alternative is followed when an extreme condition is encountered permanent damage to the cultivating frame could result and furthermore there would be the necessity to positively lock and unlock this hinge. Thus the obvious attempts to solve the humping up problem merely creates additional problems.

SUMMARY OF THE INVENTION

The general purpose of this invention is to provide a stabilizer that produces a downward force along the hinge axis of a cultivating tool that is proportional to the draft load on the tool. When the draft load is zero the downward force along the hinge axis is likewise zero and as the draft load increases the downward force along the hinge axis increases proportionately. In this way we maintain the entire cultivating tool at the same depth throughout its width. The subject stabilizer does not complicate the machine in that there is nothing that must be latched or unlatched when making the transition between transport and operation or vice versa. The hinge is not positively locked and can flex to avoid structural damage if an extreme condition is encountered. The object of the present invention is to provide a stabilizer that will exert a downward force along the hinge axis of a multi-section cultivator during operation of the machine that is proportional to the draft load on the machine.

BRIEF DESCRIPTION OF THE DRAWING

FIG. 1 illustrates a front elevation of the cultivator tool;

FIG. 2 shows a plan view of the cultivator tool; and

FIG. 3 is a side view of the stabilizer having portions of the cultivating tool cut away.

DESCRIPTION OF THE PREFERRED EMBODIMENT

Referring now to the drawings wherein like reference characters designate like or corresponding parts throughout the several views there is shown in FIG. 1 a cultivating tool such as a chisel plow generally designated 10. The cultivating tool 10 is of a single wing type having a first main section 12 and a second or wing section 13. The second or wing section 13 is joined to the first or main section 12 by a front hinge 14 and a rear hinge 15. It should be noted that the axis of the front and rear hinges 14 and 15 coincide and is substantially parallel to the direction of travel of the cultivating tool 10. The cultivating tool 10 supports a plurality of ground-engaging tools 16 such as chisel plows.

The first or main section 12 includes a tongue 20 extending in a forwardly direction therefrom. The forward free end portion of tongue 20 supports a mounting bracket 21 made up of a pair of parallel plates 22 and 23. Plates 22 and 23 have a plurality of aligned apertures 24 formed therein that are adapted to receive a mounting pin 25 that extends generally horizontal. A celvis 30 is connected to the mounting bracket 21 by the mounting pin 25. As best seen in FIG. 3 the clevis 30 has a cross member 31 which closes the elongated slot 32 formed to receive the mounting pin 25. Thus the clevis 30 can move relative to the mounting bracket 21 and mounting pin 25 an amount defined by the bight portion of the clevis 30 and the cross member 31.

Extending upwardly from the rear portion of the first or main section 12 is a mast 40 having a first guide means in the form of a pulley 41 pivotally mounted at its upper end. There is a second guide means in the form of a pulley 43 supported by the first or main section 12 and located below the first guide means 41. It should be noted that pulley 41 is mounted about an axis that is substantially parallel to the direction of travel of the cultivating tool 10 and that pulley 43 is mounted about an axis that is substantially transverse to the direction of travel of the cultivating tool 10. As best seen in FIGS. 1 and 2 the second or wing section 13 has a connecting means 42 protruding upwardly from its rear portion.

An elongated flexible force transmitting means 50 is secured at one end to the clevis 30 and extends rearwardly therefrom and is trained around pulley 43 and then extends upwardly and around pulley 41 and is then connected to the connecting means 42 of the second or wing section 13. The elongated flexible force transmitting means 50 is made up of a cable portion 51 and a spring portion 52. The spring section 52 includes a nut and threaded portion 53 for adjusting the tension therein.

What is claimed is:

1. A cultivating tool including a multi-section frame having first and second sections hinged along an axis parallel to the direction of travel, ground-engaging tools carried by said frame, a tongue secured to and protruding forwardly from said first section,
a mounting bracket secured to the forward free end of said tongue,
a mounting pin carried by said mounting bracket,
a clevis having a cross member connecting the legs thereof such that an elongated slot is defined,
said clevis receiving said mounting pin in said elongated slot for relative movement therebetween,
a mast extending upwardly from said first section,
a first guide means at the top of said mast,
connection means on said second section,
an elongated flexible force transmitting means secured at one end to said connecting means, extending over said first guide means and secured at its other end to said clevis such that a forward draft force on said clevis causes a downwardly force on the frame tending to resist an inherent upward pivoting along said axis.

2. The invention as set forth in claim 1 wherein said force transmitting means includes a spring.

3. The invention as set forth in claim 1 wherein a second guide means is carried by said first section, below said first guide means, and said force transmitting means engages the second guide means between the first guide means and its connection to the clevis.

4. The invention as set forth in claim 2 wherein a second guide means is carried by said first section, below said first guide means, and said force transmitting means engages the second guide means between the first guide means and its connection to the clevis.

5. The invention as set forth in claim 3 wherein said first guide means is a pulley mounted along an axis substantially parallel to the direction of travel and said second guide means is a pulley mounted on an axis substantially transverse to the direction of travel.

6. The invention as set forth in claim 4 wherein said first guide means is a pulley mounted along an axis substantially parallel to the direction of travel and said second guide means is a pulley mounted on an axis substantially transverse to the direction of travel.

7. The invention as set forth in claim 2 wherein means are provided for adjusting the tension in said spring.

8. The invention as set forth in claim 4 wherein means are provided for adjusting the tension in said spring.

9. The invention as set forth in claim 6 wherein means are provided for adjusting the tension in said spring.

* * * * *